(12) United States Patent
Krupinski (10) Patent No.: US 8,476,371 B2
(45) Date of Patent: Jul. 2, 2013

(54) INTERPOLYMER RESIN PARTICLES (75) Inventor: Steven M. Krupinski, Pittsburgh, PA (US)

(73) Assignee: NOVA Chemicals Inc., Moon Township, PA (US)

( * ) Notice: Subject to any disclaimer, the term of this patent is extended or adjusted under 35 U.S.C. 154(b) by 0 days.

(21) Appl. No.: 13/308,871

(22) Filed: Dec. 1, 2011

(65) Prior Publication Data

US 2012/0309859 A1  Dec. 6, 2012

Related U.S. Application Data

(62) Division of application No. 13/020,962, filed on Feb. 4, 2011, now Pat. No. 8,101,686, which is a division of application No. 12/169,776, filed on Jul. 9, 2008, now Pat. No. 7,906,589, which is a division of application No. 11/007,678, filed on Dec. 8, 2004, now Pat. No. 7,411,024.

(60) Provisional application No. 60/537,784, filed on Jan. 20, 2004.

(51) Int. Cl.
*C08L 23/00* (2006.01)
*C08L 23/04* (2006.01)
*C08L 23/10* (2006.01)
*C08L 25/02* (2006.01)

(52) U.S. Cl.
USPC .......................................... 525/240; 525/241

(58) Field of Classification Search
USPC .................................................. 525/240, 241
See application file for complete search history.

(56) References Cited

U.S. PATENT DOCUMENTS

| | | | |
|---|---|---|---|
| 3,959,189 A | 5/1976 | Kitamori | |
| 4,168,353 A | 9/1979 | Kitamori | |
| 4,303,756 A | 12/1981 | Kajimura et al. | |
| 4,303,757 A | 12/1981 | Kajimura et al. | |
| 4,622,347 A | 11/1986 | Fudge | |
| 4,647,593 A | 3/1987 | Bartosiak et al. | |
| 4,677,134 A | 6/1987 | Fudge | |
| 4,692,471 A | 9/1987 | Fudge | |
| 4,782,098 A | 11/1988 | Allen et al. | |
| 7,906,589 B2 * | 3/2011 | Krupinski | 525/192 |
| 2006/0063847 A1 | 3/2006 | Matsumura et al. | |
| 2006/0217452 A1 | 9/2006 | Inada et al. | |

* cited by examiner

*Primary Examiner* — Nathan M Nutter
(74) *Attorney, Agent, or Firm* — Lawrence T. Kale; Gary F. Matz (57) ABSTRACT

Interpolymer resin particles that include from about 20% to about 60% by weight based on the weight of the particles of uncross-linked polyolefin resin particles having a VICAT softening temperature greater than 85° C. and from about 40% to about 80% by weight based on the weight of the interpolymer particles of polymerized vinyl aromatic monomer composition particles that have been polymerized in the uncross-linked polyolefin resin particles to form an interpenetrating network of polyolefin resin particles and polystyrene particles. The interpolymer resin particles have a gel content ranging from about 0 to about 1.5% by weight based on the weight of the interpolymer resin particles, a VICAT softening temperature ranging from about 90° C. to about 115° C., and a melt index value ranging from about 0.2 to about 35.0 g/10 minutes (Condition G).

11 Claims, 1 Drawing Sheet

INTERPOLYMER RESIN PARTICLES

CROSS REFERENCE TO RELATED PATENT APPLICATIONS

This application is a Division of Application Ser. No. 13/020,962 filed Feb. 4, 2011 entitled "Interpolymer Resin Particles" now U.S. Pat. No. 8,101,686 which is a Division of application Ser. No. 12/169,776 filed Oct. 30, 2008 entitled "Interpolymer Resin Particles" now U.S. Pat. No. 7,906,589, which is a divisional application from application Ser. No. 11/007,678 filed Dec. 8, 2004 entitled "Interpolymer Resin Particles" now U.S. Pat. No. 7,411,024, which claims the benefit of priority of U.S. Provisional Application Ser. No. 60/537,784 filed Dec. 22, 2003 entitled "Interpolymer Resin Particles," which are all herein incorporated by reference in their entirety.

BACKGROUND OF THE INVENTION

1. Field of the Invention

The present invention relates to polyolefin resin particles that contain a vinyl aromatic monomer that is polymerized in the polyolefin matrix to form an interpenetrating network of polyolefin-polymerized vinyl aromatic monomer, e.g. polystyrene. More particularly, the present invention relates to interpolymer resin particles that have little or no gel content; to a process for producing the interpolymer resin particles; to a polymer composition comprising the interpolymer resin particles and a second polymer; and to articles made from the interpolymer resin particles and/or from the aforesaid polymer composition. These articles may be formed via processing techniques, e.g. sheet extrusion, rotomolding, thermoforming, compression molding, injection molding, blown film extrusion, and direct-injection foamed sheet extrusion.

2. Background Art

It is known to polymerize vinyl aromatic monomers, such as styrene, in polyethylene. For example, U.S. Pat. No. 3,959,189 issued to Kitamori and assigned to Sekisui Kaseihin Kabushiki Kaisha, discloses a process for producing polyethylene resin particles. The polyethylene resin particles have a melt index (MI) value of 0.3 to 10 (Condition I, 190° C., 2.16 kg), a density of less than 0.93 g/cm$^3$ and a VICAT softening point below 85° C. After the polyethylene resin particles are added to an aqueous suspension, 30% to 100% by weight based on the weight of the particles of a styrene monomer and a catalyst for polymerizing the monomer are added to the suspension, and the styrene monomer is polymerized therein. Embodiments include adding a cross-linking agent to the polyethylene prior to the polymerization and cross-linking the polyethylene before impregnating a blowing agent into the polyethylene resin particles to form foamable polyethylene resin particles. In view of the cross-linking agent, the polyethylene-polystyrene resin particles generally have high gel content, i.e. from about 10% to 45% by weight. The gel content of the final foamed shaped article can be as high as 60% to 80% by weight. Even though these cross-linked polyethylene-polystyrene resin foams may have superior thermal stability and toughness, these same characteristics make these resin particles unsuitable for use in processes such as compounding, extrusion processing, and injection molding since the cross-linking effect tends to reduce the melt flow of these particles which affects the processability of these particles in that the amperage needed to operate the processing machinery, e.g. extruder is increased. The melt fracture is therefore increased resulting in surface irregularities, such as holes and ridges.

A further example of polystyrene resin polymerized in polyethylene resin particles is described in Japanese Patent No. 32623/70. Cross-linking of the polyethylene resin, polymerization of styrene, and impregnation of the blowing agent are carried out at the same time. Since the polyethylene resin particles are cross-linked, the polyethylene resin particles generally contain a high gel content, i.e. at least about 24% by weight, making these polyethylene resin particles generally unsuitable for polymer processing, such as extrusion, injection molding, blown film, and direct injection foamed sheet extrusion. If the gel content is too high, hard spots form on the surface resulting in poor surface quality. The processing of the polymer proves to be difficult due to the high amperage needed for the machinery used to process the polymer, for example, extruders or injection molding machines.

U.S. Pat. No. 4,782,098 assigned to General Electric Co. discloses expandable interpolymer beads comprising polyphenylene ether resin and a polymerized vinyl aromatic monomer such as styrene. The vinyl aromatic monomer is polymerized in the presence of a polymerization catalyst to polymerize the vinyl aromatic monomer with the polyphenylene ether to form the interpolymer beads. Optionally, a cross-linking agent is added. A blowing agent is introduced under pressure into the thermoplastic resin beads. The cross-linking agent may be di-t-butyl peroxide, t-butyl cumyl peroxide, dicumyl peroxide, alpha,alpha-bis(t-butyl peroxy)p-di-isopropylbenzene, 2,5-dimethyl-2,5-di(t-butyl peroxy) hexyne-3,2,5-dimethyl-2,5-di(benzoyl peroxy)hexane, and t-butyl peroxy isopropyl carbonate. Here again, when a cross-linking agent is used, the polyphenylene ether resin has a gel content of at least about 24% by weight. Since the morphology of the polyphenylene ether resin is amorphous, the resin generally may have poor environmental stress crack resistance (ESCR) properties.

U.S. Pat. Nos. 4,303,756 and 4,303,757 to Kajimura, et al. and assigned to Sekisui Kaseihin Kogyo Kabushiki Kaisha disclose a process for producing expandable thermoplastic resin beads. The process comprises suspending in an aqueous medium 20% to 70% by weight of a random copolymer of propylene and ethylene (U.S. Pat. No. 4,303,756) or polypropylene resin particles (U.S. Pat. No. 4,303,757), and 30% to 80% by weight of a vinyl aromatic monomer such as styrene; polymerizing the vinyl aromatic monomer in the presence of a polymerization catalyst to graft the vinyl aromatic monomer onto the backbone of polypropylene; and, optionally, adding a cross-linking agent to form graft-copolymerized thermoplastic resin beads; and introducing a blowing agent into the thermoplastic resin beads.

In general, the interpolymer resin particles of the above prior art generally are expandable thermoplastic resin particles having a high gel content of about 10% to 45% by weight in at least one instance and in the other instances about 24% by weight which limits the processability of the beads or particles when converted into articles such as solid sheet, film, etc. through processing techniques such as sheet extrusion, rotomolding, thermoforming, compression molding, injection) molding, blown film extrusion, and direct-injection foamed sheet extrusion. Also, in general the interpolymer resin particles of the prior art are impregnated with a blowing agent in a further suspension process to form foamable or expandable particles that are used for foam moldings.

Expandable interpolymers of polypropylene and polyvinyl aromatic monomers are also disclosed in Kent D. Fudge U.S. Pat. Nos. 4,622,347; 4,677,134 and 4,692,471; and in Bartosiak et al U.S. Pat. No. 4,647,593, all of which are assigned to Atlantic Richfield Company. These interpolymers may be prepared according to the teachings of the aforesaid U.S. Pat.

No. 4,303,756. The interpolymers are made expandable by impregnating them with a blowing agent. The particles are expanded under normal conditions for polystyrene particles to low density, fine cell structure foams by viscbreaking the interpolymers to a melt flow (Condition L) of at least double their original value and adding a lubricant and cell control agent while maintaining orientation stress in the final product at a minimum. Since the interpolymer particles of these aforesaid patents may be prepared according to U.S. Pat. No. 4,303,756, the interpolymer particles have the same limitations outlined in the above discussion of the '756 patent in that the interpolymer particles generally have a high gel content, i.e. about 24% by weight. These viscbroken interpolymer particles are impregnated with a blowing agent in a further suspension process to produce foamable or expandable particles for foam moldings.

SUMMARY OF THE INVENTION

The invention overcomes the above-described disadvantages of the prior art.

The present invention provides non-expandable interpolymer resin particles with a crystalline morphology and having little or no gel content, whereby the processing characteristics of the particles in fabrication equipment for forming articles, such as sheet or film or foam, is improved. The gel content ranges from about 0 to about 1.5% by weight, preferably, from about 0 to about 0.8% by weight, and more preferably, from about 0 to about 0.5% by weight based on the weight of the interpolymer particles. The VICAT softening temperature of the interpolymer resin particles ranges from about 90° C. to about 115° C., and the melt index values range from about 0.2 to about 35.0 g/10 minutes (Condition G).

The invention provides a process for producing interpolymer resin particles comprising: a) suspending in an aqueous medium from about 20% to 60% by weight of polyolefin resin particles having a VICAT softening temperature greater than 85° C. and a melt flow of about 2.1 g/10 minutes (Condition I, 190° C., 2.16 kg); b) minimizing or eliminating the cross-linking of the polyolefin resin particles; c) adding to the aqueous suspension from about 40 to 80% by weight of a vinyl aromatic monomer and a polymerization initiator for polymerizing the vinyl aromatic monomer within the polyolefin resin particles; and d) polymerizing said vinyl aromatic monomer in said polyolefin resin particles to form said interpolymer resin particles having a gel content ranging from about 0 to about 1.5% by weight, based on the weight of the interpolymer resin particles.

The invention provides a process for producing articles with improved processability and/or ESCR characteristics by using the process in the above paragraph to produce interpolymer particles and using these particles in polymer processing techniques such as those described herein.

According to a further aspect of the invention, there are provided interpolymer resin particles comprising from about 20% to 60% by weight of polyolefin particles and from about 40 to 80% by weight of polymerized vinyl aromatic monomer and which particles have a gel content ranging from about 0 to about 1.5% by weight, based on the weight of the interpolymer resin particles.

In the invention, the degree of cross-linking of the polyolefin in the interpolymer resin particles is minimal or eliminated. This can be accomplished by eliminating the use of the high temperature cross-linking agent, e.g. dicumyl peroxide for the polyolefin, e.g. polyethylene. The result is an interpolymer resin having a gel content ranging from 0 to 1.5% by weight based on the weight of the interpolymer resin particles. This feature of the invention in conjunction with the interpolymer particles having a VICAT softening temperature ranging from about 90° C. to about 115° C. and a resultant melt index ranging from about 0.2 to about 35.0 g/10 minutes (Condition G) improves the processing characteristics or the processability of the interpolymer resins.

The interpolymer resin particles preferably do not contain a blowing agent that is impregnated in the resin particles through a further suspension process. Therefore, the resultant interpolymer resin particles are not expandable or foamable particles as those of the above prior art for use in foam moldings.

The interpolymer resin particles are generally intended to be used to produce articles through polymer processing techniques, such as sheet extrusion, injection molding, thermoforming, compression molding, blown film extrusion, rotomolding, and direct-injection foamed sheet extrusion at low power consumption and no melt fracture. A sheet or layer formed from the interpolymer particles of the invention may be used as a tie layer in multi-layer structures.

Unlike the interpolymer particles of the prior art, the interpolymer particles of the invention are easily extruded into solid sheets, films, etc. and injection molded into articles with improved solvent resistance (ESCR) compared to articles made solely from polystyrene or polyethylene. The flexural and tensile properties of the articles formed from the interpolymer resin particles of the invention have values that range between those values for articles made solely from polystyrene and those values for articles made solely from low-density polyethylene, while the thermal and impact properties approach that of pure polystyrene.

The interpolymer resin particles of the invention are particularly advantageous in end-use applications such as solid sheets, foamed sheets, foamed boards, injection molded articles, barrier films, and as a tie layer in multi-layer structures. In a multi-layer structure, the adjacent layer or layers are generally polyethylene, polystyrene or high impact polystyrene. These formed articles have improved properties such as those discussed in the preceding paragraph.

The interpolymer particles may be easily adapted to foam applications where a blowing agent is mixed into the molten interpolymer resin particles in conventional extrusion foaming equipment to produce foamed sheet or foamed board with improved cushioning and improved ESCR properties compared to polystyrene foamed sheet or foamed board applications. U.S. Pat. No. 6,166,099 issuing to Steven M. Krupinski (NOVA Chemicals Inc., assignee) on Dec. 26, 2000 teaches in columns 7 and 8, a conventional extrusion process and related equipment, which may be used for foam applications of the interpolymer resin particles, the teachings of which are incorporated herein by reference.

The interpolymer resin particles generally are pellets formed through a suspension process, which pellets are then converted into film, sheet etc. through an extrusion process, or injection molding or thermoforming. The pellets formed in the suspension process generally weight between about 8 milligrams to about 20 milligrams.

According to a further aspect of the invention, the resin particles may be used for the fabrication of articles via (extrusion or injection) blow molding, injection molding, rotomolding, profile extrusion, solid sheet extrusion, thermoforming, and direct-injection foamed sheet extrusion.

A still further aspect of the invention is to provide a polymer composition comprising the interpolymer particles and a second polymer such as polyethylene and polystyrene.

It is therefore, an object of the present invention to provide interpolymer resin particles or a polymer composition comprising the interpolymer particles that result in improved processability to form articles with improved ESCR characteristics, improved vapor barrier characteristics, and/or improved physical properties.

It is a further object of the present invention to provide interpolymer resin particles that have little or no gel content, i.e. ranging from about 0 to about 1.5% by weight based on the weight of the interpolymer resin particles.

These and other objects of the present invention will be better appreciated and understood by those skilled in the art from single FIGURE and the following description and appended claims.

DETAILED DESCRIPTION OF THE INVENTION

The term "polyolefin" as used herein can be polyethylene, polypropylene, thermoplastic olefins (TPO'S), or thermoplastic elastomers (TPE'S) resins. Preferably, in the invention the polyolefin is a polyethylene resin or polypropylene resin.

The term "polyethylene resin" as used in the present specification and the appended claims, is meant to include not only a homopolymer of ethylene, but also an ethylene copolymer composed of at least 50 mole %, preferably at least 70 mole %, of an ethylene unit and a minor proportion of a monomer copolymerizable with ethylene, and a blend of at least 50% by weight, preferably at least 60% by weight, of the ethylene homopolymer or copolymer with another polymer.

Examples of monomers copolymerizable with ethylene are vinyl acetate, vinyl chloride, propylene, butene, hexene, acrylic acid and its esters, methacrylic acid and its esters. The other polymer that may be blended with the ethylene homopolymer or copolymer may be any polymer compatible with it. Examples are polypropylene, polybutadiene, polyisoprene, polychloroprene, chlorinated polyethylene, polyvinyl chloride, a styrene/butadiene copolymer, a vinyl acetate/ethylene copolymer, an acrylonitrile/butadiene copolymer, a vinyl chloride/vinyl acetate copolymer, etc. Especially preferred species are polypropylene, polybutadiene and styrene/butadiene copolymer.

Examples of polyethylene that can be advantageously employed in the present invention are low-, medium-, and high-density polyethylene, an ethylene vinyl acetate copolymer, an ethylene/propylene copolymer, a blend of polyethylene and polypropylene, a blend of polyethylene and an ethylene/vinyl acetate copolymer, and a blend of polyethylene and an ethylene/propylene copolymer.

The polyethylene resin particles used to form the interpolymer resin particles of the invention have a melt index (MI) of about 2.1 g/10 minutes under Condition I, 190° C., 2.16 kg (equivalent to 11.9 g/10 minutes under Condition G, 230° C. 5.0 kg); a number average molecular weight of 20,000 to 60,000; an intrinsic viscosity, at 75° C. in xylene, of 0.8 to 1.1; a density of 0.910 to 0.940 g/cm$^3$, and a VICAT softening temperature greater than 85° C. In the embodiments herein, the polyethylene resin particles have a VICAT softening temperature of about 94° C., a melt index (MI) of 2.1 g/10 minutes (Condition I, 190° C., 2.16 kg which is equivalent to 11.9 g/10 minutes under Condition G, 230° C., 5.0 kg), a density of 0.919 g/cm$^3$, and a weight of about 20 milligrams.

A suitable low-density polyethylene (LDPE) is that obtained from NOVA Chemicals Inc. under the trade name LA-0218-AF.

The term "polypropylene resin" as used herein is meant to denote not only a homopolymer of propylene, but also a block copolymer containing polypropylene in an amount of at least 50% by weight and another polyolefin, and a mixture of at least 50% by weight of polypropylene and another polyolefin. In the present invention, the other polyolefin includes, for example, polyethylene, an ethylene/vinyl acetate copolymer, an ethylene/vinyl chloride copolymer, an ethylene/propylene rubber, polyisobutylene, butyl rubber, styrene/butadiene rubber, polybutene, and polybutadiene. Similar to the teachings of Kajimura, et al. U.S. Pat. No. 4,303,757, the polypropylene resin can be used in particulate form, preferably, in the form of spheres, flattened particles or pellets having a diameter of about 0.5 to 10 mm in order to cause rapid absorption of the vinyl aromatic monomer.

The amount of polyolefin used in the invention ranges from about 20% to about 60% by weight based on the weight of the interpolymer resin particles.

A vinyl aromatic monomer is used in the invention. Examples of vinyl aromatic monomers are styrene, alpha-methylstyrene, ethylstyrene, chlorostyrene, bromostyrene, vinyltoluene, vinylbenzene, and isopropylxylene. These monomers may be used either alone or in admixture. A mixture of at least 0.1% of the vinyl aromatic monomer and a monomer copolymerizable with it, such as acrylonitrile, methyl methacrylate, butyl acrylate, or methyl acrylate can also be used. As used herein, the term "vinyl aromatic monomer" means a vinyl aromatic monomer used alone or in admixture.

In an embodiment, the vinyl aromatic monomer preferably is styrene polymerized within the polyolefin resin particles.

The amount of vinyl aromatic monomer ranges from about 40% to about 80% by weight based on the weight of the interpolymer resin particles.

In general, the interpolymer resin particles are formed as follows: in a reactor, the polyolefin resin particles are dispersed in an aqueous medium prepared by adding 0.01 to 5%, preferably 2 to 3%, by weight based on the weight of the water of a suspending or dispersing agent such as water soluble high molecular materials, e.g., polyvinyl alcohol, methyl cellulose, and slightly water soluble inorganic materials, e.g., calcium phosphate or magnesium pyrophosphate, and then the vinyl aromatic monomers are added to the suspension and polymerized inside the polyolefin resin particles to form an interpenetrating network of polyolefin and vinyl aromatic monomers.

Basically any of the conventionally known and commonly used suspending agents for polymerization may be employed. These agents are well known in the art and may be freely selected by one skilled in the art. Water is used in an amount generally from 0.7 to 5, preferably 3 to 5 times that of the starting polyolefin particles added to the aqueous suspension, on a weight basis.

When the polymerization of the vinyl aromatic monomer is completed, the polymerized vinyl aromatic resin is uniformly dispersed inside the polyolefin particles.

The resulting interpolymer resin particles may be used as raw materials in producing articles such as sheets, rods, pipes, and film using an extruder, or in producing articles via injection molding, or thermoforming processes. A blowing agent may be introduced into the interpolymer resin particles to form foamed sheet via an extruder.

It has been found by the inventor that unexpected results are derived when the interpolymer particles of the invention are produced without a cross-linking agent. That is, in the suspension process no cross-linking agent such as a high temperature initiator, e.g. dicumyl peroxide is added to the polyolefin, e.g. polyethylene or polypropylene. Since the polyolefin particles are not cross-linked, the interpolymer particles have very little or no gel content, i.e. a gel content ranging from about 0 to about 1.5%, preferably from about 0 to about 0.8% by weight, and more preferably from about 0 to about 0.5% by weight, based on the weight of the particles. The VICAT softening temperature for the interpolymer resin particles ranges from about 90° C. to about 115° C., and preferably from about 90° C. and about 105° C.

The viscosity of the interpolymer particles of the invention is reduced compared to the interpolymer particles of the prior art having relatively high gel content. The reduced viscosity results in improved processing characteristics or processability of the particles so that better quality shaped articles can be manufactured by extrusion and/or by injection processes as discussed herein above.

In a direct injection foaming process, a blowing agent may be introduced into a molten mass of the interpolymer particles of the invention to produce a foamed article, such as foam sheet, foam board, etc. Suitable blowing agents include aliphatic hydrocarbons such as n-propane, n-butane, iso-butane, n-pentane, iso-pentane, n-hexane, and neopentane, cycloaliphatic hydrocarbons such as cyclobutane and cyclopentane, and halogenated hydrocarbons such trichlorofluoromethane, dichlorofluoromethane, dichlorodifluormethane, chlorodifluoromethane and dichloroetetrafluoroethane, etc. HFC's such as tetrafluoroethane, difluoroethane or HCFC's such as chlorodifluoroethane may be used. These blowing agents may be used alone or as mixtures.

A preferred amount of the blowing agent is in a range of about 2 to about 15 by weight based on the weight of the formed interpolymer particles. The specific types of blowing agents are taught in U.S. Pat. No. 3,959,189, the teachings of which are incorporated by reference. Preferably, the interpolymer resin particles are not impregnated with the blowing agent in a suspension process; instead the blowing agent is added during the formation of foam products in a conventional manner and in a conventional extrusion process, more about which is discussed herein after.

A process for producing the interpolymer particles of the invention is conveniently carried out as follows. The polyolefin particles are suspended in an aqueous medium containing a dispersing agent. The dispersing agent may be, for example, polyvinyl alcohol, methylcellulose, calcium phosphate, magnesium pyrophosphate, calcium carbonate, tricalcium phosphate, etc. The amount of dispersing agent employed is 0.01 to 5% by weight based on the amount of water.

A surfactant may be added to the aqueous medium. Generally, the surfactant is used to lower the surface tension of the suspension and to help emulsify the water/vinyl aromatic monomer mixture in the initiator and wax mixes, if used. The aqueous medium is generally heated to a temperature at which the vinyl aromatic monomer can be polymerized, i.e. from about 60° C. to about 120° C. over a period of time, for example, 12 to 20 hours. Over this 12 to 20 hour period, the vinyl aromatic monomer and the low temperature initiators for polymerizing the vinyl aromatic monomer are added to the resulting suspension containing the polyolefin particles dispersed therein. These materials may be added all at one time, or gradually in small portions. The suspension is cooled to room temperature. The interpolymer particles are acidified to remove surface suspending agent, dewatered, screened, and dried in a fluidized bed dryer.

Polymerization of the vinyl aromatic monomer occurs in the polyolefin particles. Examples of suitable initiators include organic peroxy compounds, such as peroxides, peroxy carbonates and peresters. Typical examples of these peroxy compounds are $C_{6-20}$ acyl peroxides, such as decanoyl peroxide, benzoyl peroxide, lauroyl peroxide, octanoyl peroxide, stearyl peroxide, peresters, such as t-butyl perbenzoate, t-butyl peracetate, t-butyl perisobutyrate, t-butylperoxy 2-ethylhexyl carbonate, or combinations thereof. Other initiators, different from peroxy compounds, are also possible, as for example α,α'-azobisisobutyronitrile and azobisdimethylaleronitrile.

The initiators are generally used in an amount of about 0.05 to 2 percent by weight, preferably 0.1 to 1 percent by weight, based on the weight of the vinyl aromatic monomer.

These initiators may be used alone or in combination of two or more initiators. These initiators can be dissolved in the vinyl aromatic monomers, which are to be absorbed in the polyolefin particles. These teachings appear in the aforesaid U.S. Pat. No. 3,959,189. The initiators can be dissolved in a solvent. Such solvents include toluene, benzene and 1,2-dichloropropane, etc.

The suspension polymerization is carried out in the presence of suspension stabilizers. Suitable suspension stabilizers are well known in the art and comprise organic stabilizers, such as poly(vinyl alcohol), gelatine, agar, polyvinyl pyrrolidine, polyacrylamide; inorganic stabilizers, such as alumina, bentonite, magnesium silicate; surfactants, such as sodium dodecyl benzene sulfonate; or phosphates, like tricalciumphosphate, disodium-hydrogen phosphate, optionally in combination with any of the stabilizing compounds mentioned earlier.

The amount of stabilizer may suitably vary from about 0.01% to about 5.0% by weight, based on the weight of the aqueous phase.

The polyolefin particles, and/or the interpolymer resin particles of the invention may contain an anti-static additive; a flame retardant; a colorant or dye; a filler material; stabilizers; and plasticizers, such as white oil.

The interpolymer resin particles of the invention may suitably be coated with compositions comprising silicones, metal or glycerol carboxylates, suitable carboxylates are glycerol mono-, di- and tri-stearate, zinc stearate, calcium stearate, and magnesium stearate; and mixtures thereof. Examples of such compositions may be those disclosed in GB Patent No. 1,409,285 and in Stickley U.S. Pat. No. 4,781,983. The coating composition can be applied to the interpolymer resin particles via dry coating or via a slurry or solution in a readily vaporizing liquid in various types of batch and continuous mixing devices. The coating aids in transferring the interpolymer resin particles easily through the processing equipment.

The interpolymer resin particles may contain other additives such as chain transfer agents, suitable examples including $C_{2-15}$ alkyl mercaptans, such as n-dodecyl mercaptan, t-dodecyl mercaptan, t-butyl mercaptan and n-butyl mercaptan, and other agents such as pentaphenyl ethane and the dimer of α-methyl styrene, as well as nucleating agents, such as polyolefin waxes. The polyolefin waxes, i.e. polyethylene waxes, have a weight average molecular weight of 250 to 5,000, which are typically finely divided through the polymer matrix in a quantity of 0.01 to 2.0% by weight, based on the amount of resin composition. The interpolymer resin particles may also contain from 0.1 to 0.5% by weight, talc, organic bromide-containing compounds, and polar agents as described in e.g. WO 98/01489 which comprise isalkylsulphosuccinates, sorbital-$C_8$-$C_{20}$-carboxylates, and $C_8$-$C_{20}$-alkylxylene sulphonates.

The interpolymer resin particles may be used in extrusion processing. For example, the particles may be fed into an extruder, and then extruded as a single layer or co-extruded into multi-layer structures, e.g. sheet or film. Optionally, a blowing agent may be forced into the particles passing through the extruder and a foamed sheet, board, or rod may be formed. In further embodiments, the interpolymer resin particles may be used in injection molding or may be thermoformed into desired shapes in a manner well known to those skilled in the art.

Alternatively, an extruded sheet or film produced from the interpolymer resin particles may be used as a tie layer in a multi-layer structure. A co-extrusion process may be employed wherein the interpolymer resin particles are extruded between sheets of incompatible polymers, e.g. a sheet made of polystyrene or polystyrene and rubber, e.g. high impact polystyrene (HIPS), and a sheet made of polyethylene, thereby giving improved adhesion to the multi-layer structure. It is hypothesized that the polyethylene resin in the interpolymer resin particles creates a chemical bond with the polyethylene in the polyethylene layer and that the polystyrene in the interpolymer resin particles creates a chemical bond with the polystyrene in the polystyrene layer.

This improved adhesion becomes important when a cap layer of polyethylene is extruded onto polystyrene sheet to improve ESCR, i.e. environmental stress crack resistance. A further example may pertain to the food industry where in view of FDA requirements food cannot come into contact with the substrate layer of the food container.

When polypropylene is used as the base polyolefin resin in the interpolymer particles of the invention, it may be preferable to viscbreak the polypropylene prior to, during or after interpolymer formation.

Viscbreaking is the intentional chain scission of polypropylene to produce lower molecular weight, a narrower molecular weight distribution, a slow crystallization rate, and faster molecular relaxation time in the molten state. Viscbreaking can be accomplished by extrusion under high shear to mechanically degrade the higher molecular weight chains as taught in the above Fudge U.S. Pat. Nos. 4,622,347 and 4,677,134 or can be accomplished by the use of peroxides as taught in the aforesaid Fudge U.S. Pat. No. 4,692,471 during the formation of the interpolymer resin particles. The peroxide blended with the polymers may be any of the compounds having a 10-hour half-life temperature of between 100° C. and 130° C. such as dicumyl peroxide (117° C.) or 1,3-bis(α-tert-butylperoxyisopropyl) benzene (116° C.). Examples 7 and 8 use dicumyl peroxide to viscbreak the polypropylene of the interpolymer resin particles of the invention.

The interpolymer resin particles of the invention may be combined with a second polymer to form a polymer composition which may then be used to form articles via processing, for example, sheet extrusion, rotomolding, thermoforming, compression molding, injection molding, and blown film extrusion. The second polymer may be selected from the group consisting of polyethylene and polystyrene. In this composition, the interpolymer resin particles may be present in an amount ranging from about 0.1% by weight to about 99.9% by weight and the second polymer may be present in an amount ranging from about 99.9% by weight to about 0.1% by weight. In an embodiment of the invention, the interpolymer resin particles are present in an amount ranging from about 10% by weight to about 90% by weight and the second polymer is present in an amount ranging from about 90% to about 10% by weight based on the weight of the interpolymer resin.

The following examples are intended to aid in understanding the present invention, however, in no way, should these examples be interpreted as limiting the scope thereof.

EXAMPLES

Example 1

This Example 1 relates to styrene-polyethylene interpolymer resin particles comprised of 60% by weight polystyrene and 40% by weight of low-density polyethylene, based on the weight of the interpolymer resin particles. No dicumyl peroxide cross-linking agent was added to the formulation.

A mixture of 520 pounds of de-ionized water, 9.6 pounds of tri-calcium phosphate as a suspending agent, and 27 grams of a strong anionic surfactant were charged to a polymerization reactor with the agitator running at 88 rpm to prepare an aqueous medium. The surfactant was Nacconol® 90 (Stephan Chemical Co.), which is sodium n-dodecyl benzene sulfonate. The aqueous medium was heated to about 91° C. and held for about 10 minutes. Then 112 pounds of low density polyethylene (LDPE) pellets (LA-0218-AF from NOVA Chemicals Inc.), each weighing about 20 milligrams, having a melt index at condition I (190° C., 2.16 kg) of 2.1 g/10 minutes, and a VICAT softening point of about 93° C. were added to the aqueous medium. This suspension of beads and water continued to be stirred at 88 rpm. The low temperature polystyrene initiators, i.e. 373 grams of benzyl peroxide (BPO) (75% active) and 70 grams of tertiary butyl perbenzoate (TBP) were dissolved in 84 pounds of styrene monomer to prepare a monomer solution, and this mixture was pumped into the reactor over 200 minutes. A second batch of 84 pounds of pure styrene was then added to the reactor over 100 minutes at a temperature of 91° C. The reactor contents were held at 91° C. for an additional 90 minutes to allow the styrene to soak into and react within the polyethylene. Then the reactor contents were heated to 140° C. over 2 hours and held for an additional 4 hours to polymerize the remaining styrene into polystyrene within the polyethylene matrix.

After polymerization, the reactive mixture was cooled and hydrochloric acid was added to dissolve the suspending agents. The resin particles were then washed and dried.

The average gel content for two samples of the resin particles was 0.65 weight % based on the weight of the formed interpolymer resin particles. The melt index was 1.046 g/10 minutes at condition G (230° C. and 5.0 kg).

Example 2

This Example 2 relates to interpolymer styrene-polyethylene interpolymer resin particles comprised of 70% by weight polystyrene and 30% by weight low-density polyethylene, based on the weight of the interpolymer resin particles. No dicumyl peroxide cross-linking agent was added to the formulation.

A mixture of 520 pounds Of deionized water, 9.6 pounds of tri-calcium phosphate as a suspending agent, and 27 grams of a strong anionic surfactant (Nacconol® 90) were charged to a polymerization reactor with the agitator running at about 88 rpm to prepare an aqueous medium. The aqueous medium was heated to about 91° C. and held for about 10 minutes. Then 84 pounds of low-density polyethylene pellets (LA-0218-AF) were suspended in the aqueous medium. The suspension continued to be stirred at 88 rpm. The low temperature polystyrene initiators, i.e. 356 grams of benzyl peroxide (BPO) and 66.8 grams of tertiary butyl perbenzoate (TBP) were dissolved in 98 pounds of styrene monomer to prepare a monomer solution, and this mixture was pumped into the reactor over 200 minutes. A second batch of 98 pounds of pure styrene was then added to the reactor over 100 minutes at a temperature of 91° C. The reactor contents were held at 91° C. for an additional 90 minutes to allow the styrene to soak into and react within the polyethylene. Then the reactor contents were heated to 140° C. over 2 hours and held at this temperature for an additional 4 hours to polymerize the remaining styrene into polystyrene within the polyethylene matrix.

After polymerization, the reactive mixture was cooled and hydrochloric acid was added to dissolve the suspending agents. The resin particles were then washed and dried.

The average gel content for two samples of resin particles was 0.45% by weight based on the weight of the particles. The melt index was 0.501 g/10 minutes at condition G (230° C. and 5.0 kg).

Example 3

This Example 3 relates to styrene-polyethylene interpolymer resin particles comprised of 50% by weight polystyrene and 50% by weight low-density polyethylene, based on the weight of the interpolymer resin particles. No dicumyl peroxide cross-linking agent was added to the formulation.

A mixture of 520 pounds of de-ionized water, 9.6 pounds of tri-calcium phosphate as a suspending agent, and 27 grams of a strong anionic surfactant (Nacconol® 90) were charged to a polymerization reactor with the agitator running at about 88 rpm to prepare an aqueous medium. The aqueous medium was heated to about 91° C. and held for about 10 minutes. Then 140 pounds of low-density polyethylene pellets (LA-0218-AF) were suspended in the aqueous medium. The suspension continued to be stirred at 88 rpm. The low temperature polystyrene initiators, i.e. 350 grams of benzyl peroxide (BPO) and 65.63 grams of tertiary butyl perbenzoate (TBP), were dissolved in 70 pounds of styrene monomer to prepare a monomer solution, and this mixture was pumped into the reactor over 200 minutes. A second batch of 70 pounds of pure styrene was then added to the reactor over 100 minutes at a temperature of 91° C. The reactor contents were held at 91° C. for an additional 90 minutes to allow the styrene to soak into and react within the polyethylene. Then the reactor contents were heated to 140° C. over 2 hours and held for an additional 4 hours to polymerize the remaining styrene into polystyrene within the polyethylene matrix. After polymerization, the reactive mixture was cooled and hydrochloric acid was added to dissolve the suspending agents. The resin particles were then washed and dried.

The average gel content for two samples of resin particles was 0.69% by weight based on the weight of the formed interpolymer resin particles. The melt index was 1.022 g/10 minutes at condition G (230° C. and 5.0 kg).

Example 4

This Example 4 is similar to Example 1 in that a styrene-polyethylene interpolymer with 60% by weight polystyrene and 40% by weight low density polyethylene based on the weight of the interpolymer particles was produced. In this Example 4, however, a chain transfer agent was used in an attempt to increase the melt flow rate of the interpolymer resin.

Alpha methyl styrene dimer (a chain transfer agent) in an amount of 163 grams, i.e. about 0.20 parts per hundred of styrene was added to the suspension with the benzyl peroxide (BPO) and the tertiary butyl perbenzoate (TBP).

The average gel content for two samples of the resin particles was 1.01% by weight based on the weight of the formed interpolymer resin particles. The melt index was 2.688 g/10 minutes (Condition G). These results demonstrate that when using a chain transfer agent without a cross-linking agent the melt index was increased compared to Example 1.

Example 5

In this Example 5, interpolymer resin particles were produced comprising 60% by weight polystyrene and 40% by weight ethylene vinyl acetate copolymer (EVA), based on the weight of the resin particles. No high temperature cross-linking agent, i.e. dicumyl peroxide initiator was added.

A mixture of 380 pounds of de-ionized water, 13 pounds of tri-calcium phosphate as a suspending agent, and 8.6 grams of Nacconol® 90 anionic surfactant were charged to a polymerization reactor with the agitator running at about 102 rpm to prepare an aqueous medium.

The aqueous medium was heated to about 60° C. and held for about 30 minutes. Then 125 pounds of a low-density polyethylene vinyl acetate (EVA) pellets containing 4.5% by weight vinyl acetate and 95.5% by weight ethylene (NA 480 from Equistar Chemicals, LP, Houston, Tex.) and having a density of about 0.923 g/cc and a melt index of 0.25 g/10 minutes (Condition I, 190° C., 2.16 kg) were suspended in the aqueous medium. The reactor temperature was increased to 85° C. The low temperature polystyrene initiators, i.e. 246 grams of benzoyl peroxide (BPO) and 30 grams of tertiary butyl perbenzoate (TBP), were dissolved in 22.6 pounds of styrene monomer to prepare a monomer solution, and this mixture was pumped into the reactor over 96 minutes. A second batch of 146 pounds of pure styrene and 5.0 lbs of butyl acrylate was then added to the reactor over 215 minutes. Then the reactor contents were heated and held at 140° C. for over 8 hours to finish the polymerization of styrene within the polyethylene matrix.

After polymerization was completed, the reactive mixture was cooled and removed to a wash kettle where muriatic acid (HCl) was added to dissolve the suspending agents from the pellet surfaces. The pellets were then washed and dried.

The average gel content for two samples of the resin pellets was 0.46 weight % based on the weight of the formed interpolymer resin particles. The melt index of the pellets was 0.21 g/10 minutes (Condition G).

Example 6

This Example 6 relates to interpolymer resin particles comprising 70% by weight polystyrene based on the weight of the interpolymer resin particles, and 30% by weight of ethylene vinyl acetate copolymer (EVA). No high temperature cross-linking agent, i.e. no dicumyl peroxide initiator was added. The process for making the particles was similar to that for Example 5. The low-density polyethylene vinyl acetate (EVA) used in Example 5 was the same as used in Example 6.

A mixture of 411 pounds of de-ionized water, 9.8 pounds of tri-calcium phosphate as a suspending agent, and 6.5 grams of anionic surfactant (Nacconol® 90) were charged to a polymerization reactor with the agitator running at about 102 rpm to prepare an aqueous medium. The aqueous medium was heated to about 60° C. and held for about 30 minutes. Then 87 pounds of the low-density ethyl vinyl acetate pellets were suspended in the aqueous medium. The reactor temperature was increased to 85° C. The low temperature polystyrene initiators, i.e. 246 grams of benzoyl peroxide (BPO) and 30 grams of tertiary butyl perbenzoate (TBP), were dissolved in 22.6 pounds of styrene monomer to prepare a monomer solution, and this mixture was pumped into the reactor over 96 minutes. A second batch of 146 pounds of pure styrene and 5.0 lbs of butyl acrylate was then added to the reactor over a period of 215 minutes. Then the reactor contents were heated and held at 140° C. for over 8 hours to finish the polymerization of styrene within the polyethylene matrix.

After polymerization was completed, the reactive mixture was cooled and removed to a wash kettle where muriatic acid (HCl) was added to dissolve the suspending agents from the pellet surfaces. The pellets were then washed and dried.

The average gel content for two samples of the resin pellets was 0.32% by weight based on the weight of the formed interpolymer resin particles. The melt index of the pellets was 0.25 g/10 minutes (Condition G).

Examples 7 and 8 below show that the use of dicumyl peroxide for viscbreaking purposes increases the melt index of the resin.

Example 7

This Example 7 relates to interpolymer resin particles comprising 60% by weight polystyrene based on the weight of the interpolymer resin particles, and 40% by weight of polypropylene. Dicumyl peroxide was added to viscbreak the polypropylene.

A mixture of 520 pounds of deionized water, 9.6 pounds of tri-calcium phosphate as a suspending agent, and 27 grams of Nacconol® 90 were charged to a polymerization reactor with the agitator running at about 88 rpm to prepare an aqueous medium. The aqueous medium was heated to about 91° C. and held for about 10 minutes. Then 112 pounds of polypropylene pellets (Huntsman P5M4K-046), each weighing about 20 milligrams and having a MI of 25.5 g/10 minutes (Condition G) were suspended in the aqueous medium. The suspension continued to be stirred at 88 rpm. The low temperature polystyrene initiators, i.e. 473 grams of benzyl peroxide (BPO) and 145 grams of tertiary butyl perbenzoate (TBP), and 173 grams of dicumyl peroxide (for viscbreaking the polypropylene) were dissolved in 84 pounds of styrene monomer to prepare a monomer solution, and this mixture was pumped into the reactor over 200 minutes. A second batch of 84 pounds of pure styrene was then added to the reactor over 100 minutes at a temperature of 91° C. The reactor contents were held at 91° C. for an additional 90 minutes to allow the styrene to soak into and react with the polypropylene. Then the reactor contents were heated to 140° C. for over 2 hours and held for an additional 4 hours to polymerize the styrene into polystyrene within the matrix of the polyethylene.

After polymerization, the reactive mixture was cooled and removed, and an acid was added to dissolve the suspending agents.

The average gel content for two samples of the resin particles was 0.47% by weight based on the weight of the formed interpolymer resin particles. The melt index was 32.61 g/10 minutes (Condition G).

Example 8

This Example 8 relates to interpolymer resin particles comprising 7.0% by weight polystyrene based on the weight of the interpolymer resin particles, and 30% by weight of polypropylene. Dicumyl peroxide was added to the formulation to viscbreak the polypropylene. The process for producing the interpolymer resins is similar to Example 7.

A mixture of 520 pounds of de-ionized water, 9.6 pounds of tri-calcium phosphate as a suspending agent, and 27 grams of an anionic surfactant (Nacconol® 90) were charged to a polymerization reactor with the agitator running at about 88 rpm to prepare an aqueous medium. The aqueous medium was heated to about 91° C. and held for about 10 minutes. Then 112 pounds of polypropylene pellets (Huntsman P5M4K-046) each weighing about 20 milligrams and having a MI of 25.5 g/10 minutes (Condition G) were suspended in the aqueous medium. The suspension continued to be stirred at 88 rpm. The low temperature polystyrene initiators, i.e. 475 grams of benzyl peroxide (BPO) (for improved grafting) and 145 grams of tertiary butyl perbenzoate (TEP) (for reducing the styrene residuals), and 173 grams of dicumyl peroxide for viscbreaking the polypropylene were dissolved in 98 pounds of styrene monomer to prepare a monomer solution, and this mixture was pumped into the reactor over 200 minutes. A second batch of 98 pounds of pure styrene was then added to the reactor over 100 minutes at a temperature of 91° C. The reactor contents were held at 91° C. for an additional 90 minutes to allow the styrene to soak into and react within the polypropylene. Then the reactor contents were heated to 140° C. for over 2 hours and held for an additional 4 hours to polymerize the styrene into polystyrene within the matrix of the polypropylene.

After polymerization was completed, the reactive mixture was cooled and removed, and an acid was added to dissolve the suspending agents.

The average gel content for two samples was 0.41% by weight based on the weight of the formed interpolymer resin particles. The melt index was 21.92 g/10 minutes (Condition G).

The particles produced in Examples 1-8 were oven dried at 120° F. and then molded into plaques using an Engel Model 80 injection-molding machine. The mechanical and physical properties were measured and tested according to the standards set up by ASTM. These properties appear in Table 1 below.

As stated herein above, the flexural and tensile properties of the articles formed from the interpolymer resin particles of the invention have values that range between those values for articles made solely from polystyrene and those values for articles made solely from low-density polyethylene, while the thermal and impact properties of the articles made from the interpolymer resin particles approach that of pure polystyrene.

TABLE 1

| Property | Example 1 | Example 2 | Example 3 | Example 4 | Example 5 | Example 6 | Example 7 | Example 8 |
| --- | --- | --- | --- | --- | --- | --- | --- | --- |
| Flex Modulus (KSI) | 200.52 | 256.47 | 170.46 | 222.63 | 211.19 | 269.25 | 303.89 | 348.76 |
| Flex Stress @ <5% (KSI) | 6.67 | 8.34 | 5.63 | 7.55 | 6.78 | NA | 9.14 | 9.08 |
| Strain at Break (Auto)% | 2.14 | 4.43 | 3.00 | 5.48 | 3.17 | 3.30 | 2.51 | 2.07 |
| Stress at | 3.69 | 5.09 | 3.32 | 4.54 | 4.97 | 4.91 | 4.88 | 5.43 |

TABLE 1-continued

| Property | Example 1 | Example 2 | Example 3 | Example 4 | Example 5 | Example 6 | Example 7 | Example 8 |
|---|---|---|---|---|---|---|---|---|
| Break (Auto) (KSI) | | | | | | | | |
| YOUNGS Modulus (Auto) (KSI) | NA | 281.92 | NA | 242.02 | 279.95 | 281.52 | 325.65 | 366.07 |
| IZOD Impact Mean | 0.404 | 0.233 | 0.490 | 0.446 | 0.430 | 0.338 | 0.174 | 0.150 |
| DYNATUP-Total Energy (ft-lbs) | 0.43 | 0.47 | 0.55 | 0.50 | NA | NA | 0.53 | 0.42 |
| MI (Condition G) | 1.046 | .501 | 1.022 | 2.688 | 0.21 | 0.25 | 32.61 | 21.92 |
| VICAT-Mean (° C.) | 101.00 | 104.8 | 99.00 | 101.6 | NA | NA | 110.2 | 108.7 |
| Gel wt % (Average) | 0.65 | 0.45 | 0.69 | 1.01 | 0.46 | 0.32 | 0.47 | 0.41 |

Example 9

Two and three layer sheet structures using the compositions and type of extruders shown in Table 2 were formed in a WELEX° sheet co-extrusion line. Each stream at temperatures between 430° F. and 450° F. was passed into an extrusion die head (WELEX® standard 54" flip lip) to form a continuous multi-layer sheet structure, which in turn, was passed through a roll stack at roll pressures of about 70 psig and roll temperatures ranging between 180° to 190° F. for a curing process. The multi-layer sheet structures were then visually inspected and qualitatively evaluated for adhesion, the results of which appear in Table 2. "Good" indicates no peeling of the layers. "Poor" indicates peeling of the layers.

TABLE 2

| Extruder | Layer Structure | Thickness | Adhesion |
|---|---|---|---|
| Berlyn | SCLAIR 31E | 2 mil | Poor |
| Mark II | 50% SCLAIR 31E/50% HIPS5410 | 2 mil | |
| Mark I | HIPS 5410 | 20 mil | |
| Berlyn | SCLAIR 31E | 2 mil | Good |
| Mark II | Example 4 (40% PE/60% PS) | 2 mil | |
| Mark I | HIPS 5410 | 20 mil | |
| Berlyn | SCLAIR 31E | 2 mil | Good |
| Mark II | Example 6 (70% PS/30% EVA) | 2 mil | |
| Mark I | HIPS 5410 | 20 mil | |
| Berlyn | SCLAIR 61C | 2 mil | Poor |
| Mark II | 50% SCLAIR 61C/50% HIPS5410 | 2 mil | |
| Mark I | HIPS 5410 | 20 mil | |
| Berlyn | SCLAIR 31E | 2 mil | Poor |
| Mark II | 40% SCLAIR31E/HIPS5410/20% Example 6 (70% PS/30% EVA) | 2 mil | |
| Mark I | HIPS 5410 | 20 mil | |
| Berlyn | Example 5 (60% PS/40% EVA) | 2 mil | Good |
| Mark I | HIPS 5410 | 20 mil | |
| Berlyn | Example 6 | 2 mil | Good |
| Mark I | HIPS 5410 | 20 mil | |
| Berlyn | SCLAIR 31E | 2 mil | Poor |
| Mark I | HIPS 5410 | 20 mil | |
| Berlyn | SCLAIR 61C | 2 mil | Poor |
| Mark I | HIPS 5410 | 20 mil | |

HIPS 5410 (Product of NOVA Chemicals Inc. - high impact polystyrene comprised of styrene and polybutadiene.
SCLAIR 31E (Polyethylene-Melt Index 11.5)
SCLAIR 61C (Polyethylene-Melt Index 5.3)

This Example 9 shows that "good" adhesion occurred when one of the layers of the multi-layer sheet structures consisted of 100% of the interpolymer resin particles of the invention, i.e. Examples 4, 5, and 6.

Example 10

Figure 1:
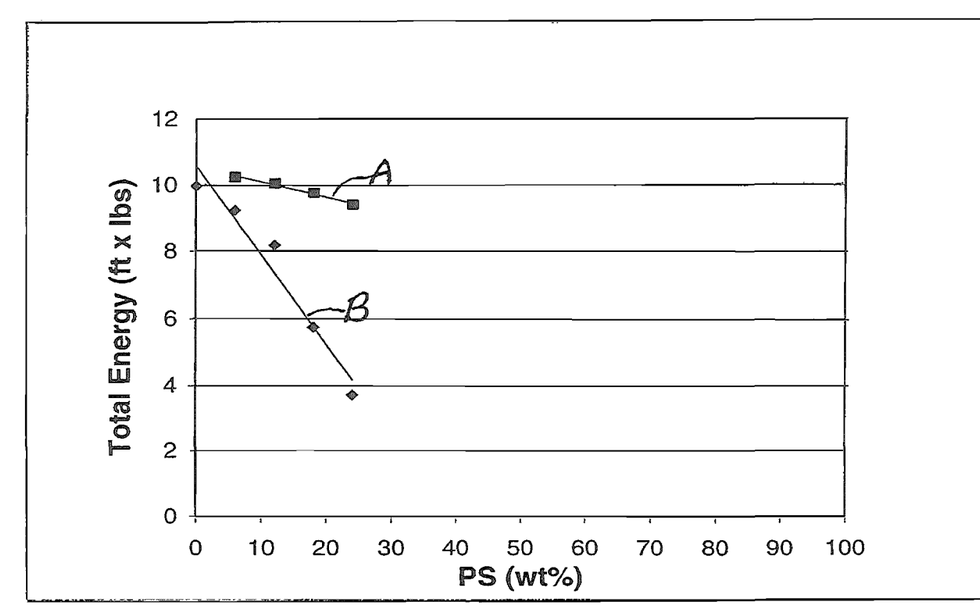
The FIGURE is a graph showing the results when Composition A and Composition B are plotted against Total Energy (ft. lbs.) (DYNATUP) versus the weight percentages of polystyrene, which is a component of Composition A and Composition B.

This Example 10 relates to the single FIGURE that illustrates instrumented impact testing values (DYNATUP-Total Energy in ft. lbs.) for Composition A and Composition B. Composition A is the composition of the invention comprising the interpolymer particles of Example 1 (60% PS/40% PE) containing polystyrene (NOVA 1210-crystal) in the weight percentages shown in the single FIGURE.

Composition B is a mixture of low-density polyethylene (NOVA-LA-0218-AF pellets) and polystyrene in the weight percentages shown in the FIGURE. Composition A and Composition B were produced by dry blending, compounding in a single-screw extruder, and the cut pellets were injection molded into 3 inch diameter circular plaques for impact testing. The DYNATUP values for Composition A of the invention remained relatively constant as the weight percentage of polystyrene increased, while those for Composition B dropped as the weight percentage of polystyrene increased. This indicates improved compatibility between polyethylene and polystyrene for the interpolymer particles of the invention compared to pure physical blends of polyethylene and polystyrene.

Example 11

This Example 11 illustrates the environmental stress crack resistance properties (ESCR) of the 70% PS/30% EVA (Example 6) resin vs. 100% Polystyrene (PS) crystal (NOVA 1510 grade). Ten specimens were used as control samples. The chemical resistance test results for molded samples are shown in Table 3.

TABLE 3

| | 0.5% Strain No oil exposure | 0.5% Strain With oil exposure |
|---|---|---|
| 70% PS/30% EVA | | |
| Specimen Thickness | 0.12 inches | 0.12 inches |
| Specimen Width | 0.51 inches | 0.51 inches |
| Tensile Stress @ Break | 5.1 kpsi | 5.07 kpsi |
| Standard Deviation | 0.1 | 0.1 |
| Tensile Strain @ Break | 2.6% | 2.6% |
| Standard Deviation | 0.2 | 0.2 |
| Young's Modulus | 268 kpsi | 271 kpsi |
| Standard Deviation | 10.4 | 8.6 |
| Percentage Decrease in Mechanical Properties | | |
| Tensile Stress @ Break | — | 0 |
| Tensile Strain @ Break | — | 0 |
| Young's Modulus | — | 0 |
| 100% PS CRYSTAL (1510 NOVA grade) | | |
| Specimen Thickness | 0.125 inches | 0.125 inches |
| Specimen Width | 0.51 inches | 0.51 inches |
| Tensile Stress @ Break | 6.25 kpsi | 1.34 kpsi |
| Standard Deviation | +/−0.3 | +/−0.4 |
| Tensile Strain @ Break | 1.5% | 0.4% |
| Standard Deviation | 0.1 | 0.1 |
| Young's Modulus | 507.3 ksi | 558.5 ksi |
| Standard Deviation | 10.2 | 93.9 |

TABLE 3-continued

| | 0.5% Strain No oil exposure | 0.5% Strain With oil exposure |
|---|---|---|
| Percentage Decrease in Mechanical Properties | | |
| Tensile Stress @ Break | — | 80 |
| Tensile Strain @ Break | — | 74 |
| Young's Modulus | — | −10.1 |

Notes:
All specimens were conditioned at 23° C. and 50% relative humidity before chemical resistance exposure or testing. The food substance used was a solution of 50% cottonseed oil and 50% oleic acid (by weight). All tensile testing was performed using a 0.2 inch/minute crosshead speed using a 2" extensiometer.

For a 7-day period, the "Tensile Stress@Break" fell off by 80% for PS Crystal specimens exposed to 0.5% strain and a mixture of oils, i.e. 6.25 kpsi was reduced to 1.34 kpsi, while the "Tensile Stress@Break" for the interpolymer of Example 6 remained relatively the same, i.e. 5.07 kpsi vs. 5.10 kpsi.

While the present invention has been particularly set forth in terms of specific embodiments thereof, it will be understood in view of the instant disclosure that numerous variations upon the invention are now enabled yet reside within the scope of the invention. Accordingly, the invention is to be broadly construed and limited only by the scope and spirit of the claims now appended hereto.

What is claimed is:

1. Interpolymer resin particles comprising:
   from about 20% to about 60% by weight based on the weight of the particles of uncross-linked polyolefin resin particles having a VICAT softening temperature greater than 85° C.; and
   from about 40% to about 80% by weight based on the weight of said interpolymer particles of polymerized vinyl aromatic monomer composition particles that have been polymerized in said uncross-linked polyolefin resin particles to form an interpenetrating network of polyolefin resin particles and polystyrene particles,
   wherein said interpolymer resin particles have,
   a gel content ranging from about 0 to about 1.5% by weight based on the weight of said interpolymer resin particles,
   a VICAT softening temperature ranging from about 90° C. to about 115° C., and
   a melt index value ranging from about 0.2 to about 35.0 g/10 minutes (Condition G).

2. Interpolymer resin particles of claim 1 wherein said interpolymer resin particles have a VICAT temperature ranging from about 90° C. to about 105° C. and a gel content ranging from about 0 to about 0.8% by weight based on the weight of said interpolymer resin particles.

3. Interpolymer resin particles of claim 1 wherein said weight of said polyolefin resin particles is about 30% by weight and said weight of said polystyrene is about 70% based on the weight of said interpolymer resin particles.

4. Interpolymer resin particles of claim 1 wherein said weight of said polyolefin resin particles is about 40% and said weight of said polystyrene is about 60%, based on the weight of said interpolymer resin particles.

5. Interpolymer resin particles of claim 1 wherein said weight of said polyolefin resin particles is about 50% and said weight of said polystyrene is about 50%, based on the weight of said interpolymer resin particles.

6. Interpolymer resin particles of claim 1 wherein said vinyl aromatic monomer is selected from the group consisting of styrene, alphamethylstyrene, ethylstyrene, chlorostyrene, bromostyrene, vinyltoluene, vinylbenzene, isopropylxylene, and mixtures thereof.

7. Interpolymer resin particles of claim 6 wherein said polyolefin resin of said polyolefin resin particles is selected from the group consisting of polyethylene, polypropylene, thermoplastic olefins (TPO's), and thermoplastic elastomers (TPE's) resins.

8. Interpolymer resin particles of claim 7 wherein said vinyl aromatic monomer is styrene and wherein said polyolefin resin of said polyolefin resin particles is selected from the group consisting of polyethylene resin and polypropylene resin.

9. Interpolymer resin particles of claim 8 wherein said polyethylene resin is selected from the group consisting of low-density polyethylene and ethylene vinyl acetate.

10. Interpolymer resin particles of claim 1 wherein said resin particles are pellets and said each pellet weighs from about 8 milligrams to about 20 milligrams.

11. The interpolymer resin particles according to claim 1, wherein the vinyl aromatic monomer composition includes at least 0.1% of the vinyl aromatic monomer and at least one other monomer selected from the group consisting of acrylonitrile, methyl methacrylate, butyl acrylate, and methyl acrylate.

* * * * *